(12) United States Patent
Yamamoto

(10) Patent No.: US 6,855,936 B2
(45) Date of Patent: Feb. 15, 2005

(54) CASSETTE-TYPE IMAGE TAKING APPARATUS AND RADIOGRAPHIC APPARATUS

(75) Inventor: Osamu Yamamoto, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 198 days.

(21) Appl. No.: 10/224,613

(22) Filed: Aug. 21, 2002

(65) Prior Publication Data

US 2003/0042418 A1 Mar. 6, 2003

(30) Foreign Application Priority Data

Aug. 27, 2001 (JP) ........................................ 2001-256742
Jul. 25, 2002 (JP) ........................................ 2002-216511

(51) Int. Cl.$^7$ ................................................ G01T 1/24
(52) U.S. Cl. ............................... 250/370.09; 250/336.1
(58) Field of Search .......................... 250/370.09, 336.1

(56) References Cited

U.S. PATENT DOCUMENTS

| | | | | |
|---|---|---|---|---|
| 5,661,309 A | * | 8/1997 | Jeromin et al. | 250/580 |
| 5,664,270 A | * | 9/1997 | Bell et al. | 5/600 |
| 5,754,881 A | * | 5/1998 | Aas | 710/2 |
| 5,773,832 A | * | 6/1998 | Sayed et al. | 250/370.09 |
| 5,773,839 A | * | 6/1998 | Krepel et al. | 250/580 |
| 5,804,832 A | * | 9/1998 | Crowell et al. | 250/580 |
| 5,877,501 A | * | 3/1999 | Ivan et al. | 250/370.09 |
| 6,075,256 A | | 6/2000 | Kaifu et al. | 257/53 |
| 6,433,341 B1 | * | 8/2002 | Shoji | 250/370.09 |
| 6,630,676 B2 | * | 10/2003 | Takemoto | 250/370.09 |
| 2002/0017610 A1 | * | 2/2002 | Takemoto | 250/370.09 |

FOREIGN PATENT DOCUMENTS

JP  8-116044  5/1996

* cited by examiner

*Primary Examiner*—Albert Gagliardi
(74) *Attorney, Agent, or Firm*—Fitzpatrick, Cella, Harper & Scinto

(57) ABSTRACT

A cassette-type image taking apparatus for acquiring a radiograph of an object includes an electric circuit unit including a radiation image detecting unit, of which a radiation image detecting face is substantially formed of a quadrangle, a case which contains said electric circuit unit, a handle provided at a side face of said case facing one side of said quadrangle, where a face containing a radiation incident face of said case opposite said radiation image detecting face is supposed to be the front face, and a connecting port which is capable of connecting, in a detachable manner, a cable for electrically connecting said electric circuit unit and an external device, at least part of said connecting port being provided in a handle-side side region as a side face region of said case in the same side of said handle with respect to a plane containing said one side and a normal line of said radiation image detecting face crossing said one side.

13 Claims, 11 Drawing Sheets

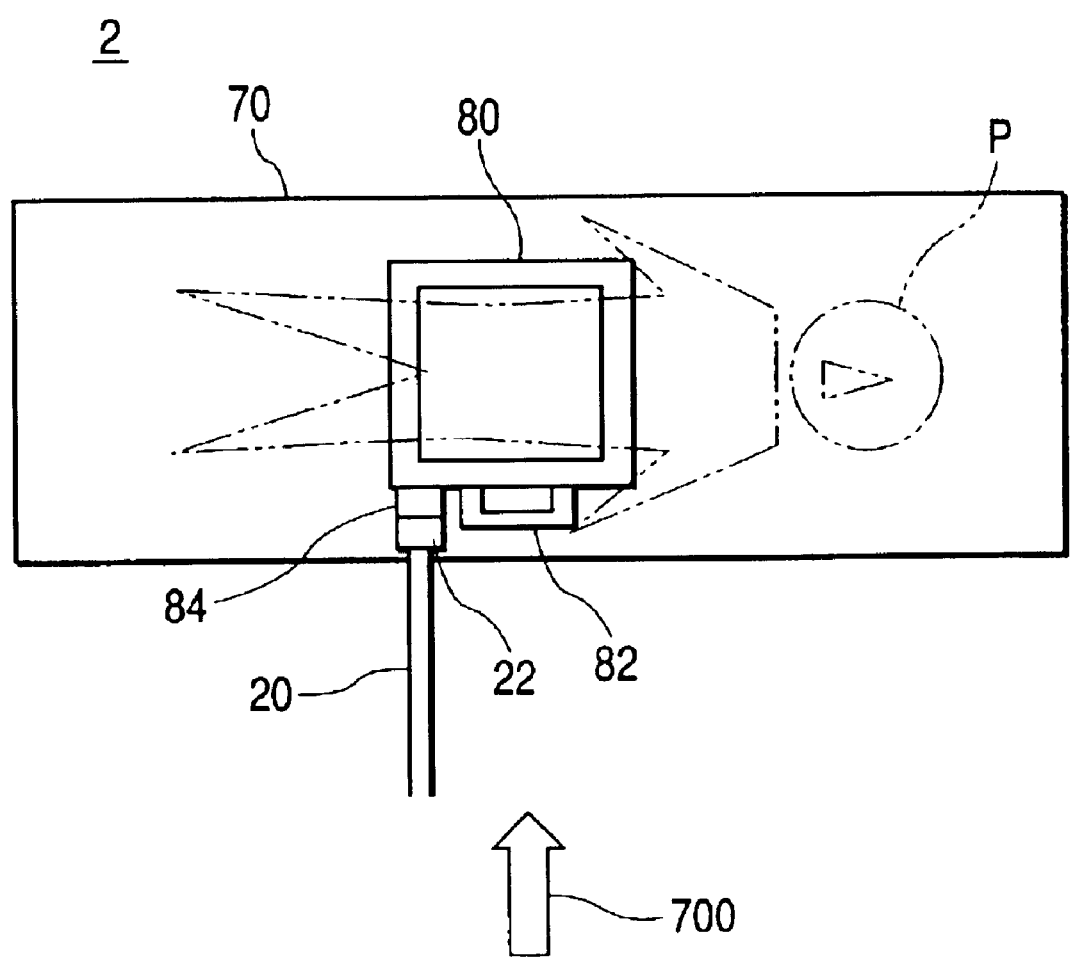

CASSETTE-TYPE IMAGE TAKING APPARATUS AND RADIOGRAPHIC APPARATUS

BACKGROUND OF THE INVENTION

1. Field of the Invention

The present invention relates to a cassette-type image taking apparatus and a radiographic apparatus.

2. Related Background Art

Methods by which an object is irradiated with a radiation, the intensity distribution of the radiation transmitted by the object is detected and a radiograph of the object is obtained are extensively used in industrial nondestructive tests and medical diagnoses.

In recent years, there have been developed digital radiographic apparatuses each using a radiation detector composed by stacking two-dimensional array sensors in which optical detection elements, consisting of minute photoelectric conversion elements, switching elements and the like, are arranged in a grid form and a scintillator for converting a radiation into visible light. The digital radiographic apparatus converts a radiation transmitted by an object into visible light with the scintillator, and detects this visible light as an electric signal with the photoelectric converting portions of the optical detection elements. This electric signal, after being read out from each optical detection element by a prescribed reading method, undergoes analog-to-digital (A/D) conversion, resulting in a digital radiographic signal. This radiographic signal, after undergoing signal processing in various ways by an image processing device downstream, is reproduced (visualized) by reproducing means such as a CRT into a radiographic image.

Such a digital radiographic apparatus is broader in the range of radioactive dose (dynamic range) that can be detected than a radiographic apparatus using a silver salt film and a fluorescent screen (or sensitized paper), and has a another advantage of being able to instantaneously provide a processed visible image because an image signal converted into an electric signal can be immediately obtained. Furthermore, the digital image data that have been obtained can be transferred by wire or wireless means to a system control unit, a storage server or the like to be readily incorporated into a database.

Incidentally, there are two types of radiographic apparatuses for taking still pictures for medical use, the console type and the portable type, of which one or the other can be selected according to the applicable to the patient to be diagnosed. The console type usually has, underneath a table on which the patient is laid, an image taking apparatus containing film or a photoelectric converter, and irradiates the patient with a radiation emitted from the above to acquire a radiographic image (for instance, an abdominal image). The portable type is used when the patient is so seriously ill to be brought to the table under which the image taking apparatus is installed or when a specific photographic method is used which is incompatible with the console type. In such a case, a portable image taking apparatus (known as a cassette) is inserted under the patient's body, which is irradiated with a radiation from above to obtain a radiographic image. Especially in the former case, the portable type radiographic apparatus has to be brought to where the patient is, it is desirable for the apparatus to be minimized in size and weight to improve its portability and operating ease.

However, for a portable digital radiographic apparatus; an electronic cassette is more difficult to be reduced in size and weight than a film cassette because an electronic cassette or a cassette-type image taking apparatus has to be mounted with many constituent elements needed for outputting a radiographic image as a digital image data, such as a two-dimensional array sensor and an A/D converter circuit. Moreover, if cables for power supply and data transmission are eliminated and data are transmitted wirelessly, a memory for temporary storage of digital image data and a power source unit (battery) for supplying power to the electronic cassette will be additionally needed, making it even more difficult to reduce the size and weight.

Therefore, following consideration of portability and operating ease, it has been proposed to use electronic cassette, while making best efforts to reduce the size and weight of an electronic cassette which would use cables for power supply and/or data transmission, to make the cables detachable and connect them only when, for instance, an image is picked up and data are transmitted.

FIG. 10 is a schematic diagram illustrating a portable digital radiographic apparatus 1000 according to the prior art. The radiographic apparatus 1000 is configured by connecting via a cable 1300 an electronic cassette 1100 which converts into digital image data a radiation transmitted by a patient P, which is the object, and a control unit 1200 which transmits a control signal for driving the electronic cassette 1100 and receives digital image data from the electronic cassette 1100. A power supply unit 1400 for supplying power to the cassette is also connected by the cable 1300.

In using the radiographic apparatus 1000, the electronic cassette 1100 in a state of not being connected to the cable 1300 is, for instance, inserted between the patient P and a bed 1500 as shown in FIG. 11 and arranged in a region suitable for image pickup. FIG. 11 here is a sketchy diagram showing an example of arrangement of the electronic cassette 1100. Upon completion of arranging the electronic cassette 1100, the cable 1300 is connected to a connecting port 1110 of the electronic cassette 1100 to establish connection among the electronic cassette 1100, the control unit 1200 and the power supply unit 1400. Then, receiving control signals from the control unit 1200 and power from the power supply unit 1400 via the cable 1300, the electronic cassette 1100 begins to operate and picks up an image. After the image is picked up, digital image data are transmitted from the electronic cassette 1100 to the control unit 1200 via the cable 1300.

However, if the operator, when arranging the electronic cassette 1100 to which the cable 1300 is not yet connected, arranges the electronic cassette 1100 without paying attention to its connecting port 1110, the state illustrated in FIG. 12 may arise. FIG. 12 here is a sketchy diagram showing one example of case in which the connecting port 1110 of the electronic cassette 1100 is positioned between the patient P and the bed 1500. As a result, in order to connect the cable 1300 to the connecting port 1110 of the electronic cassette 1100, the operator will have to raise the body of the patient P and connect the cable 1300 to the connecting port 1110 or once pull out the electronic cassette 1100, change is direction, again insert it between the patient P and the bed 1500, and connect the cable 1300 to the connecting port 1110. In either case, the patient P will be forced to change his or her bodily posture.

The detection area of the radiation detector of the electronic cassette 1100 may be shaped in a 17"×15" rectangle, for instance, to match the size of a commercially available film or film cassette. In this case, conceivably, the electronic cassette 1100 may be arranged as illustrated in FIGS. 13A and 13B. FIGS. 13A and 13B here are sketchy diagrams illustrating examples of arrangement of the electronic cassette 1100. FIG. 13A shows a case in which the connecting port 1110 of the electronic cassette 1100 is not positioned between the patient P and the bed 1500, while FIG. 13B shows a case in which the connecting port 1110 of the electronic cassette 1100 is positioned between the patient P and the bed 1500.

However, if the connecting port 1110 of the electronic cassette 1100 is positioned between the patient P and the bed 1500 as shown in FIG. 13B, the patient P will be forced to change his or her posture as described above when the cable 1300 is connected to the connecting port 1110.

Also, as an electronic cassette may be used in many different positions with a patient whose bodily movement is strictly limited, the operator is imposed by the trouble of having to pay particular attention to the position of the connecting port of the electronic cassette in arranging the electronic cassette.

Therefore, it is desirable for the operator to be able to easily connect the cable to the electronic cassette and for the patient not to be obliged to change his or her posture for the convenience of cable connection to the electronic cassette.

SUMMARY OF THE INVENTION

The present invention accordingly has as its object to solve the problems described above.

An aspect of the present invention is a cassette-type image taking apparatus for acquiring a radiograph of an object, comprising:

an electric circuit unit including a radiation image detecting unit;

a case which contains the electric circuit unit; and a plurality of connecting ports provided in the case, each of which is capable of connecting, in a detachable manner, a cable for electrically connecting the electric circuit unit and an external device.

Preferably, a radiation detecting face of the radiation image detecting unit is substantially formed of a quadrangle and the connecting ports are provided at least two corners of a side face of the case, each of the corners faces a corner of at least opposite two corners of the four corners of the quadrangle, where a face containing a radiation incident face of the case opposite the radiation detecting face is supposed to be the front face.

Preferably, the connecting ports are provided at four corners of the side face of the case facing the four corners of the quadrangle respectively.

Preferably, a cassette-type image taking apparatus further provides with a control circuit which identifies one of the plurality of connecting ports to which the cable is connected, and permits only the identified connecting port to establish electric connection between the electric circuit unit and the external device.

Preferably, the electric connection is utilized for at least one of power supply from the external device to the electric circuit unit and communication between the electric circuit unit and the external device.

Another aspect of the present invention is a cassette-type image taking apparatus for acquiring a radiograph of an object, comprising:

an electric circuit unit including a radiation image detecting unit, of which a radiation image detecting face is substantially formed of a quadrangle;

a case which contains the electric circuit unit;

a handle provided at a side face of the case facing one side of the quadrangle, where a face containing a radiation incident face of the case opposite the radiation image detecting face is supposed to be the front face; and a connecting port which is capable of connecting, in a detachable manner, a cable for electrically connecting the electric circuit unit and an external device, at least part of the connecting port being provided in a handle-side side region as a side face region of the case in the same side of the handle with respect to a plane containing the one side and a normal line of the radiation image detecting face crossing the one side.

Preferably, a plurality of the handles are provided at a plurality of side faces of the case facing a plurality of sides of the quadrangle respectively.

Preferably, two of the handles are provided at side faces of the case facing adjacent two sides of the quadrangle respectively, and the connecting port is at least partly provided at a region in common with respective the handle-side side regions of the two handles.

Preferably, two of the handles are provided at two side faces of the case facing adjacent two sides of the quadrangle respectively, and two of the connecting ports different from each other are at least partly provided at the handle-side side regions of the two of the handles respectively.

Preferably, four of the handles are provided at four side faces of the case facing four sides of the quadrangle respectively.

Preferably, four of the connecting ports different from one another are at least partly provided at the handle-side side regions of the four of the handles respectively.

Preferably, the connecting port is utilized for at least one of power supply from the external device to the electric circuit unit and communication between the electric circuit unit and the external device.

Another aspect of the present invention is a radiographic apparatus comprising:

a cassette-type image taking apparatus for acquiring a radiograph of an object, comprising:

an electric circuit unit including a radiation image detecting unit;

a case which contains the electric circuit unit; and a plurality of connecting ports provided in the case, each of which is capable of connecting, in a detachable manner, a cable for electrically connecting the electric circuit unit and an external device, and the external device.

Preferably, the external device has at least either of functions of controlling an operation of the cassette-type image taking apparatus and processing data from the cassette-type image taking apparatus.

Another aspect of the present invention is a radiographic apparatus comprising:

a cassette-type image taking apparatus for acquiring a radiograph of an object, comprising:

an electric circuit unit including a radiation image detecting unit, of which a radiation image detecting face is substantially formed of a quadrangle;

a case which contains the electric circuit unit;

a handle provided at a side face of the case facing one side of the quadrangle, where a face containing a radiation incident face of the case opposite the radiation image detecting face is supposed to be the front face; and a connecting port which is capable of connecting, in a detachable manner, a cable for electrically connecting the electric circuit unit and an external device, at least part of the connecting port being provided in a handle-side side region as a side face region of the case in the same side of the handle with respect to a plane containing the one side and a normal line of the radiation image detecting face crossing the one side, and the external device.

Preferably, the external device has at least either of functions of controlling an operation of the cassette-type image taking apparatus and processing data from the cassette-type image taking apparatus.

BRIEF DESCRIPTION OF THE DRAWINGS

The accompanying drawings, which are incorporated in and constitute a part of the specification, illustrate embodiments of the invention and, together with the descriptions, serve to explain the principle of the invention.

FIG. 7 is a schematic diagram of another radiographic apparatus;

DETAILED DESCRIPTION OF THE PREFERRED EMBODIMENTS

A preferred embodiment of the present invention will be described in detail in accordance with the accompanying drawings.

Figure 1:
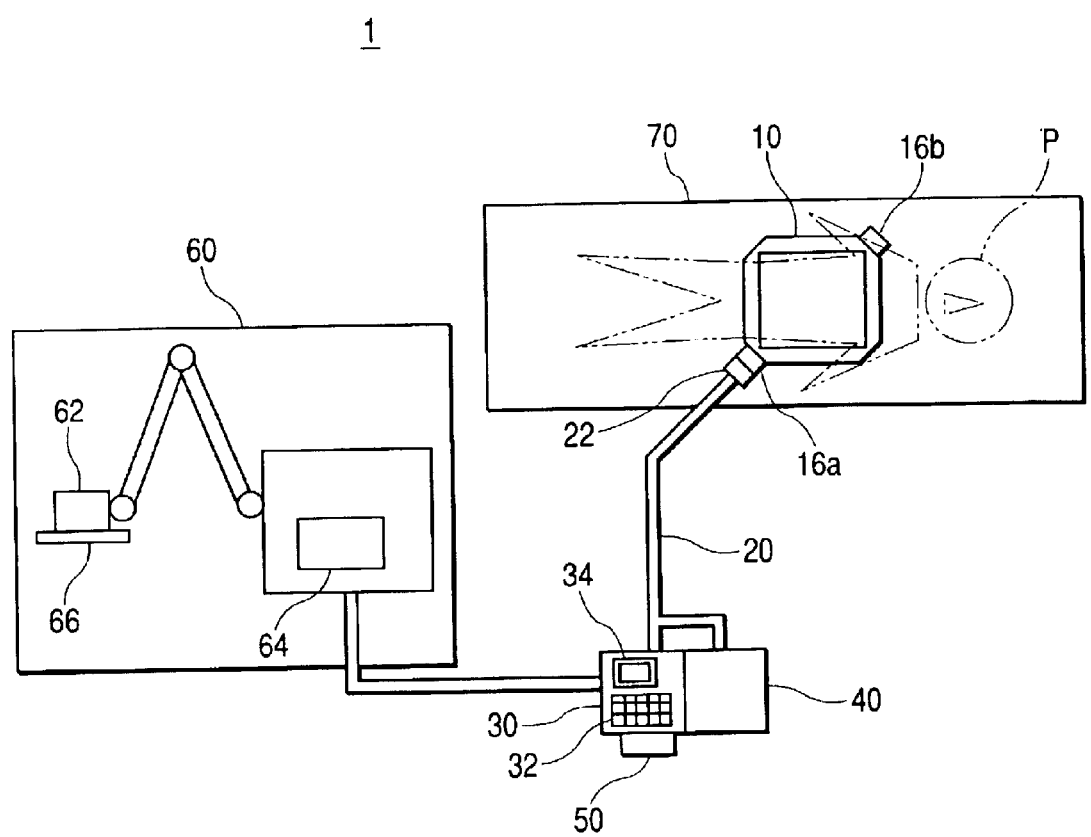
FIG. 1 is a schematic diagram of a radiographic apparatus.

A radiographic apparatus 1 of the present embodiment will be described with reference to accompanying drawings. However, the invention is not confined to this and other embodiments described herein, but constituent elements in these embodiments can be replaced by others as far as the object of the invention can be achieved. FIG. 1 here is a schematic diagram of the radiographic apparatus 1 in this embodiment. The radiographic apparatus 1, as illustrated therein, has an electronic cassette 10, a cable 20, a system control unit 30, a power supply unit 40, a memory unit 50 and a radiation generator 60. The radiographic apparatus 1 is a digital radiographic apparatus which, by using an irradiating radiation, acquires the internal structure of the object as digital image data.

The electronic cassette 10 is an image taking apparatus which converts a radiation transmitted by an object into visible light, and converts this visible light into an electric signal to generate digital image data of the object. The electronic cassette 10 is shaped in a substantially quadrangular form as viewed in the direction normal to the radiation image detecting face of the radiation image detecting unit (which refers to the optical image detecting face or the like of the optical image detecting unit), and is provided with connecting ports 16a and 16b at two diagonally opposite ones of the four vertexes (which may also be referred to as corners) of the quadrangle.

Figure 2:
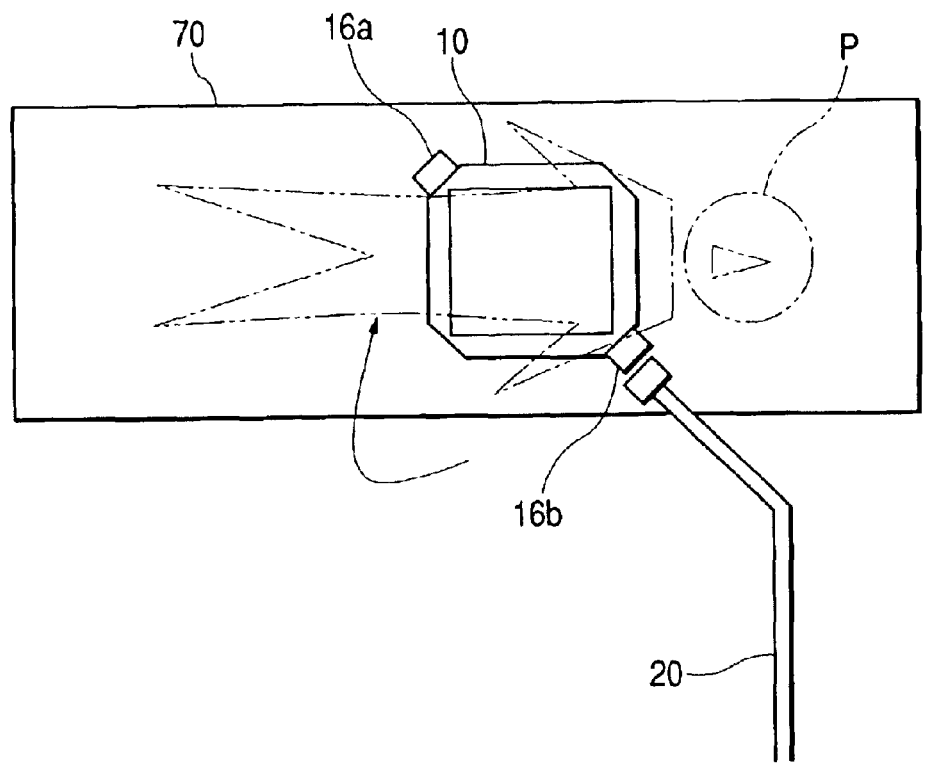
FIG. 2 is a sketchy diagram illustrating an example of arrangement of the electronic cassette shown in FIG. 1.

Therefore, not only can the cable 20 be connected to the connecting port 16a of the electronic cassette 10 as shown in FIG. 1, the cable 20 can as well be connected to the connecting port 16b as shown in FIG. 2 by turning the electronic cassette 10 by 90°. FIG. 2 here is a sketchy diagram illustrating an example of arrangement of the electronic cassette 10.

Thus, as one of the connecting ports 16a and 16b is always in a convenient position for the operator to connect the cable 20, he or she can arrange the electronic cassette 10 without paying particular attention to the positions of the connecting ports 16a and 16b of the electronic cassette 10. Nor does the patient P have to be obliged to change his or her posture for the convenience of connecting the cable 20.

Although the electronic cassette 10 (i.e. the radiation detection area) shown in FIGS. 1 and 2 has a substantially square shape, even if it is rectangularly shaped, the same effect can be achieved because the connecting ports 16a and 16b are also at diagonally opposite vertexes. While this embodiment of the invention has two connection ports, all the four vertexes may be provided with such ports for greater convenience of connection.

Figure 3:
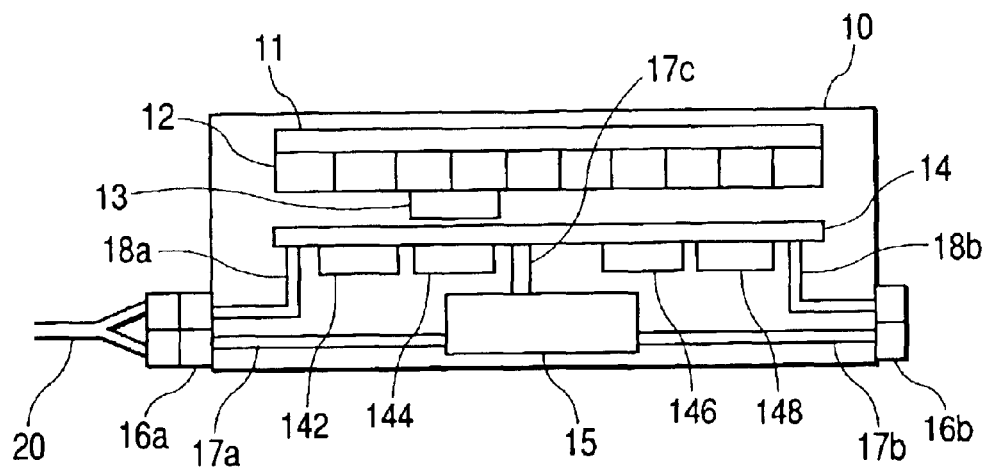
FIG. 3 is a schematic sectional block diagram of the electronic cassette shown in FIG. 1.

FIG. 3 is a schematic sectional block diagram of the electronic cassette 10. The electronic cassette 10, as illustrated therein, a scintillator 11, an optical image detecting unit 12, a luminous energy monitoring unit 13, an electrical circuit board 14, a control circuit 15, the connecting ports 16 (reference numeral 16 collectively refer to 16a and 16b, power cables 17 (reference numeral 17 collectively refer to 17a through 17c) and transmission cables 18 (reference numeral 18 collectively refer to 18a and 18b). In addition, such constituent elements of the electronic cassette containing electrical circuit elements as the optical image detecting unit 12, the luminous energy monitoring unit 13 and the electrical circuit board 14 will be referred to individually as electrical circuit parts or collectively as the electrical circuit part.

The scintillator 11 converts the radiation that transmitted the object into visible light. In the scintillator 11, the parental substance of the fluorescent material is excited by the high energy radiation, and the recombination energy generated in recombination gives fluorescence in the visible region. Such fluorescence derives from the parental substance itself, such as $CaWO_4$, and luminescent center substances activated in the parental substance, such as CSI:Tl and ZnS:Ag.

The optical image detecting unit 12 is arranged in close adherence to the scintillator 11 and, as disclosed in Japanese Patent Application Laid-Open No. 8-116044 for instance, is configured by arranging photoelectric conversion elements and thin film transistors (TFTs) in a matrix form. The optical image detecting unit 12 converts the visible light from the scintillator 11 generated by irradiation with the radiation into an electric signal.

The luminous energy monitoring unit 13, configured by forming a film of amorphous silicon light receiving element on the back side of the optical image detecting unit 12, monitors the amount of exposure to the radiation. The luminous energy monitoring unit 13 detects, out of the visible light from the scintillator 11 caused to emit light by the irradiation with radiation, light that transmits the optical image detecting unit 12 and transfers it to the system control unit 30.

Over the electrical circuit board 14 are mounted a drive circuit 142 which drives the optical image detecting unit 12 in accordance with a control signal sent from the radiation generator 60, an amplifier 144 which amplifies and otherwise processes an analog signal from an element (matching a pixel) in the optical image detecting unit 12 selected by the drive circuit 142, an analog-to-digital (A/D) conversion circuit 146 which digitally converts the output from the amplifier 144, and a serializing circuit 148 which serializes image data successively digitalized by the drive circuit 142 and the A/D conversion circuit 146. The electrical circuit board 14 is wired with the power cables 17 for transmitting power to individual constituent elements and the signal cables 18 for transmitting signals.

The control circuit 15 determines which of the connecting ports 16a and 16b the cable 20 has been connected to, and opens the power supply gate of the connecting port 16a or 16b, whichever the cable 20 is connected to. At the same time, it keeps closed the power supply gate of the connecting port 16a or 16b, whichever the cable 20 is not connected to.

Figure 4A:
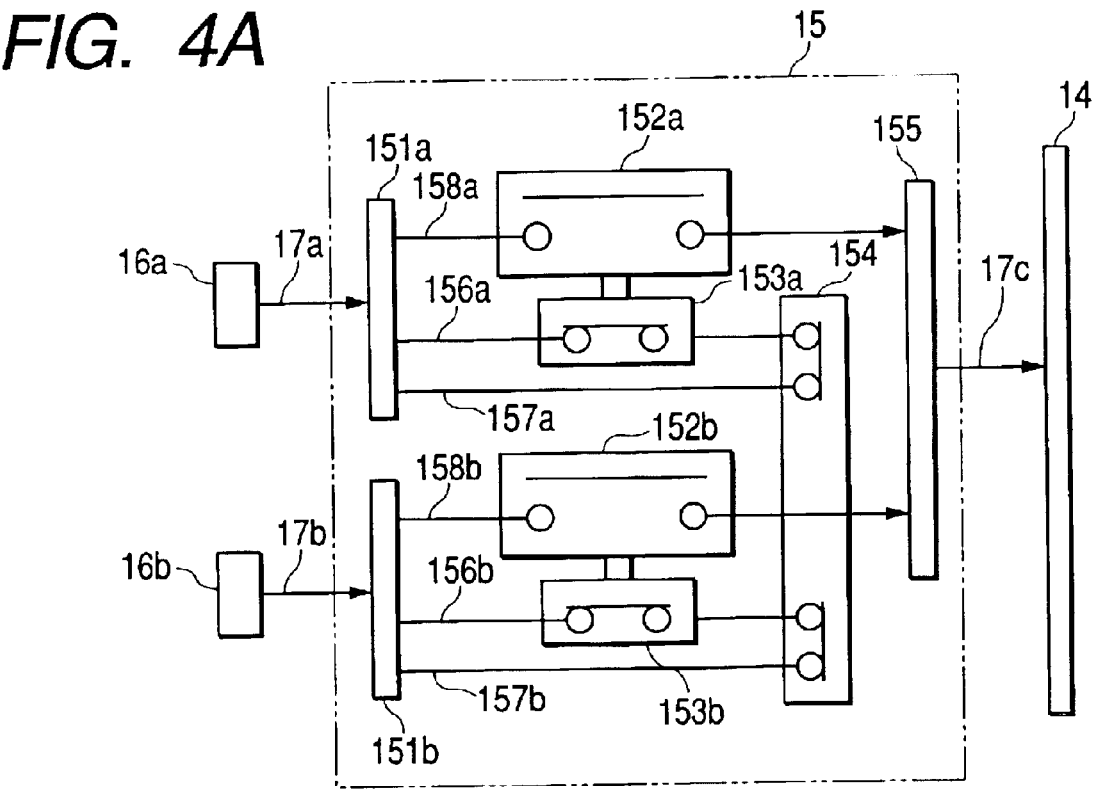
FIGS. 4A and 4B show the circuit configuration of the control circuit shown in FIG. 3.
Figure 4B:
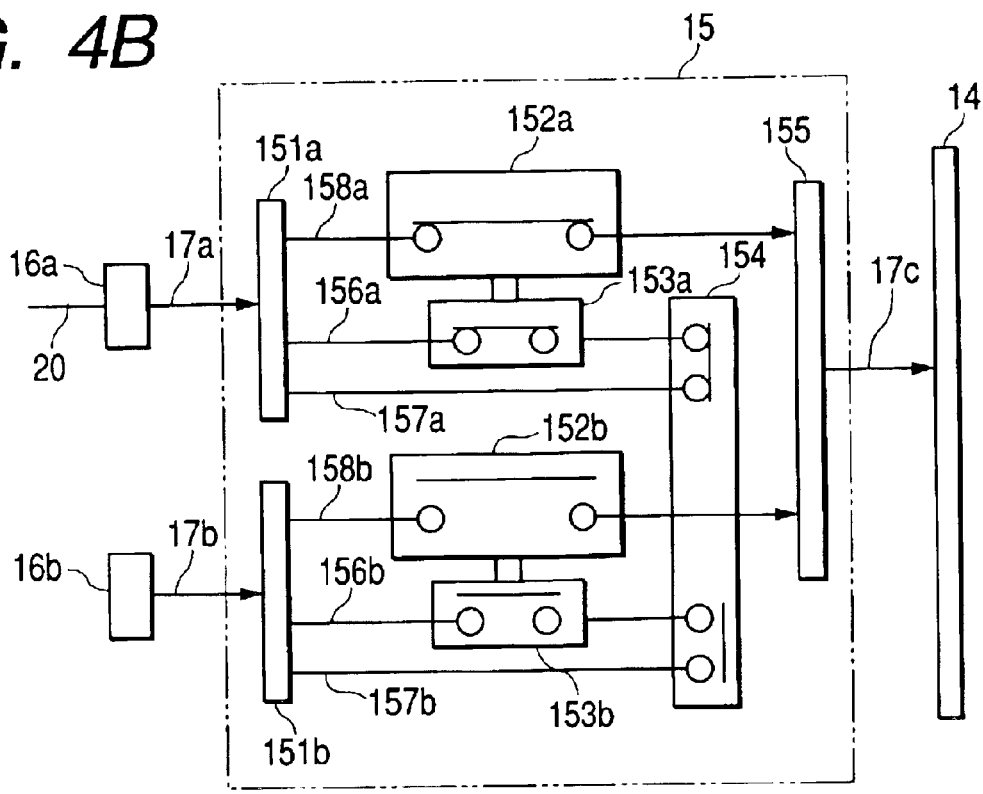

The control circuit 15 has, as shown in FIGS. 4A and 4B, input ports 151a or 151b for power supply from the power supply unit 40, relay circuits 152a and 152b which open and close the power supply at various DC voltages needed for driving various circuits mounted on the electrical circuit board 14 and the optical image detecting unit 12, trigger circuits 153a and 153b which take charge of the operations of the relay circuits 152a and 152b, an the OR circuit 154 consisting of two gates and an output port 155. The input ports 151a and 151b are connected to the power cables 17a and 17b, respectively, and the output port 155 is connected to the power cable 17c.

FIGS. 4A and 4B here illustrate the configuration of the control circuit 15. FIG. 4A is a schematic block diagram illustrating the state of the control circuit 15 in which the cable 20 is connected to neither of the connecting ports 16a and 16b of the electronic cassette 10, FIG. 4B is a schematic block diagram illustrating the state of the control circuit 15 in which the cable 20 is connected to the connecting port 16a of the electronic cassette 10.

Referring to FIG. 4A, since the cable 20 is connected to neither of the connecting ports 16a and 16b of the electronic cassette 10, the gates of the relay circuits 152a and 152b are closed and those of the trigger circuits 153a and 153b are open. The two gates of the OR circuit 154 are open.

Referring now to FIG. 4B, when the cable 20 is connected to the connecting port 16a of the electronic cassette 10, a current is transmitted to the input port 151a via the power cable 17a. A current flowing through a trigger line 156a passes the open gate of the trigger circuit 153a and, after further passing the open one of the gates of the OR circuit, reaches a ground line 157a. As a result, the trigger circuit 153a and the OR circuit 154 become electrically energized.

The trigger circuit 153a in the electrically energized state causes the gate of the relay circuit 152a to be opened. As a result, a power current flowing through a power supply line 158a passes the open gate of the relay circuit 152a, and electrically energizes the electrical circuit board 14 via the output port 155 and the power cable 17c.

On the other hand the OR circuit 154, when one gate is electrically energized, closes the unenergized gate and at the same time closes the gate of the unenergized trigger circuit (the trigger circuit 153b in this embodiment). As a result, the gate of the relay circuit 152b remains closed, keeping the part down to the connecting port 16b in an insulated state, with no current flowing there. Therefore, even if the operator or the patient P touches the connecting port 16b, there is no danger of being struck by electricity. Similarly, even if cables for a second control unit and a second power supply unit (neither shown) are connected to the connecting port 16b, no short circuiting will occur.

The same is true of a situation in which the cable 20 is connected anew to the connecting port 16b when the cable 20 has been connected to neither of the connecting ports 16a and 16b of the electronic cassette 10. When the cable 20 is connected to the connecting port 16b of the electronic cassette 10, a current is transmitted to the input port 151b via the power cable 17b. Then, the current flowing through a trigger line 156b passes the open gate of the trigger circuit 153b and, after further passing the other open gate of the OR circuit, reaches a ground line 157b. As a result, the trigger circuit 153b and the OR circuit 154 become electrically energized.

The trigger circuit 153b in the electrically energized state causes the gate of the relay circuit 152b to be opened. As a result, a power current flowing through a power supply line 158b passes the open gate of the relay circuit 152b, and electrically energizes the electrical circuit board 14 via the output port 155 and the power cable 17c. Similarly to what was described above, the OR circuit 154 turns the connecting port 16a side into an insulated state.

When the cable 20 is disconnected from the connecting port 16a or 16b, the relay circuits 152a and 152b, the trigger circuits 153a and 153b and the OR circuit 154 return to a state in which the cable 20 is not connected to the connecting ports 16a and 16b as shown in FIG. 4A.

Even if the connecting ports for the cable 20 are increased from just two including 16a and 16b to three or more, the control circuit 15 can be adapted to the changed situation by adopting a new circuitry in which the number of gates of the OR circuit 154 is increased and electrical energizing of the gate of one connecting port would automatically close all the gates linked to the other connecting ports.

The connecting ports 16 are connecting ports for the cable 20, which enable the cable 20 to be connected or disconnected as desired. The connecting ports 16 are differentiated between the power system and the signal system to match the cable 20, which is a composite cable of power lines and signal lines.

The power cables 17 transmit power from the power supply unit 40 to the constituent elements of the electronic cassette 10. The power cables 17 include the power cable 17a for power supply to the control circuit 15 via the connecting port 16a, the power cable 17b for power supply to the control circuit 15 via the connecting port 16b and the power cable 17c for power supply to the electrical circuit board 14 via the control circuit 15.

The signal cables 18 make possible communication between the electronic cassette 10 and the system control unit 30. The signal cables 18 include the signal cable 18a which makes possible communication between the electronic cassette 10 and the system control unit 30 via the connecting port 16a and the signal cable 18b which makes possible communication between the electronic cassette 10 and the system control unit 30 via the connecting port 16b.

Figure 5:
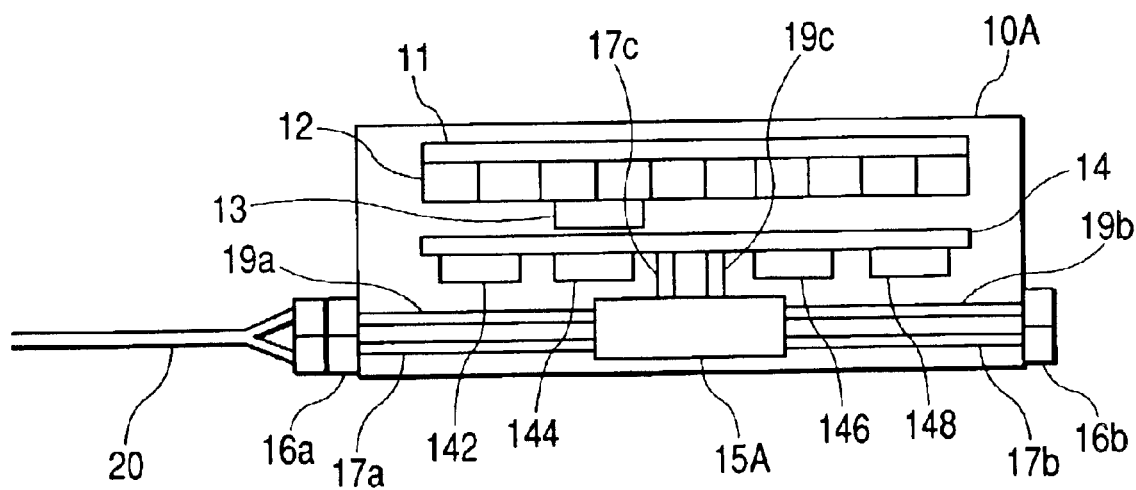
FIG. 5 is a schematic sectional block diagram of an electronic cassette, which is a variation of the electronic cassette shown in FIG. 3.

Next will be described an electronic cassette 10A, which is a variation of the electronic cassette 10 with reference to FIG. 5. Its members having counterparts in the electronic cassette 10 will be assigned respectively the same reference numerals, and duplication of their description will be avoided. FIG. 5 here is a schematic sectional block diagram of the electronic cassette 10A. The cable 20 connected to the system control unit 30 and the power supply unit 40 is connected to the connecting port 16a.

The electronic cassette 10A, as shown in FIG. 5, has a control circuit 15A in place of the control circuit 15 and signal cables 19a through 19c in place of the signal cables 18a and 18b. The electronic cassette 10A is an image taking apparatus which converts a radiation transmitted by an object into visible light, and converts this visible light into an electric signal to generate digital image data of the object.

Figure 6A:
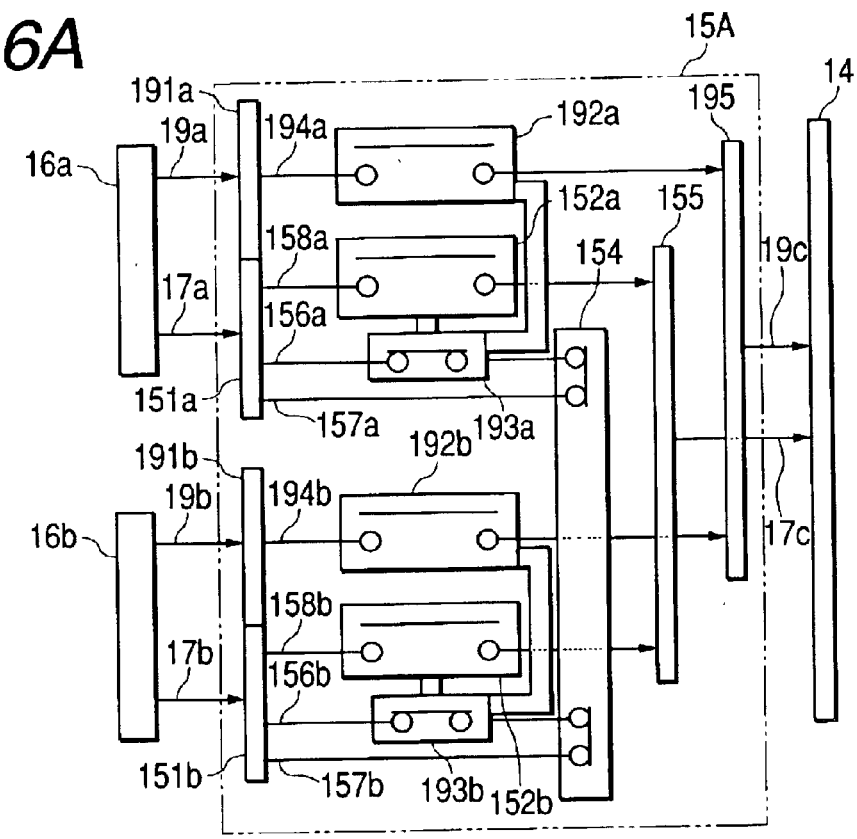
FIGS. 6A and 6B show the circuit configuration of the control circuit shown in FIG. 5.
Figure 6B:
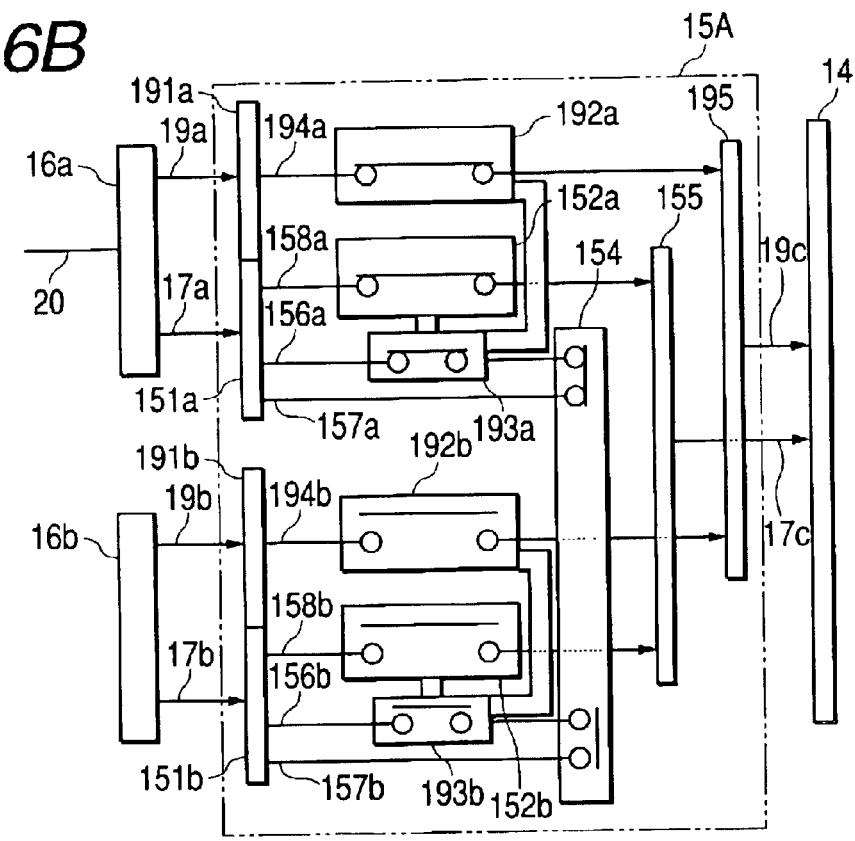

The control circuit 15A differs from the control circuit 15 in that, as shown in FIGS. 6A and 6B, it is additionally provided with connecting ports 191a and 191b to be connected to the signal cables 19a and 19b, relay circuits 192a and 192b which open and close the transmission of various signals for driving circuits mounted on the electrical circuit board 14 and the optical image detecting unit 12, signal lines 194a and 194b which connect the connecting ports 191a and 191b to the relay circuits 192a and 192b, and a connecting port 195, and has circuits 193a and 193b in place of the trigger circuits 153a and 153b. The connecting ports 191a and 191b are respectively connected to transmission cables 19a and 19b, and the connecting port 195 is connected to a transmission cable 19c.

FIGS. 6A and 6B here are configurational diagrams showing the circuit configuration of the control circuit 15A. FIG. 6A is a schematic block diagram showing the control circuit 15A in a state in which the cable 20 is connected to neither of the connecting ports 16a and 16b of the electronic cassette 10A and FIG. 6B, a schematic block diagram showing the control circuit 15A in a state in which the cable 20 is connected to the connecting port 16a of the electronic cassette 10A.

Referring to FIG. 6A, since the cable is connected to neither of the connecting ports 16a and 16b of the electronic cassette 10A, the relay circuits 152a and 152b and the gates of the relay circuits 192a and 192b are closed and the gates of the trigger circuits 193a and 193b are open. The two gates of the OR circuit 154 are open.

Referring to FIG. 6B, when the cable 20 is connected to the connecting port 16a of the electronic cassette 10A, a current is transmitted the input port 151a via the power cable 17a. Then the current flowing through the trigger line 156a passes the open gate of the trigger circuit 193a and, after further passing the open the other gate of the OR circuit, reaches the ground line 157a. As a result, the trigger circuit 193a and the OR circuit 154 become electrically energized.

The electrically energized trigger circuit 193a causes the gate of the relay circuit 152a to be opened. As a result, a power current flowing through the power supply line 158a passes the open gate of the relay circuit 152a, and electrically energizes the electrical circuit board 14 via the output port 155 and the power cable 17c.

At the same time, the trigger circuit 193a causes the gate of the relay circuit 192a to be opened. As a result, the part from the connection port 191a to the electrical circuit board 14 via the connecting port 195 and the transmission cable 19c is electrically energized. Therefore, the transmission of drive signals by the system control unit 30 to circuits mounted on the electrical circuit board 14 and the optical image detecting unit 12 and that of digital image data from the electrical circuit board 14 to the system control unit 30 become possible from the connecting port 16a side.

On the other hand, the OR circuit 154, when one gate is electrically energized, closes the unenergized gate and at the same time closes the gate of the unenergized trigger circuit (the trigger circuit 193b in this embodiment). As a result, the gates of the relay circuits 152b and 192a remain closed, keeping the part down to the connecting port 16b in an insulated state, with no current flowing there. Therefore, even if the operator or the patient P touches the connecting port 16b, there is no danger of being struck by electricity. Similarly, even if cables for a second control unit and a second power supply unit (neither shown) are connected to the connecting port 16b, no short circuiting will occur. Nor will occur any drive error of the image taking apparatus 10A due to transmission of commands on the signal system on two lines.

The same is true of a situation in which the cable 20 is connected anew to the connecting port 16b when the cable 20 has been connected to neither of the connecting ports 16a and 16b of the electronic cassette 10A. When the cable 20 is connected to the connecting port 16b of the electronic cassette 10A, a current is transmitted to the input port 151b via the power cable 17b. Then, the current flowing through the trigger line 156b passes the open gate of the trigger circuit 193b and, after further passing the open one of the gates of the OR circuit, reaches the ground line 157b. As a result, the trigger circuit 193b and the OR circuit 154 become electrically energized.

The trigger circuit 193b in the electrically energized state causes the gate of the relay circuit 152b to be opened. As a result, a power current flowing through a power supply line 158b passes the open gate of the relay circuit 152b, and electrically energizes the electrical circuit board 14 via the output port 155 and the power cable 17c.

At the same time, the trigger circuit 193b causes the gate of the relay circuit 192b to be opened. As a result, the part from the connection port 191b to the electrical circuit board 14 via the connecting port 195 and the transmission cable 19c is electrically energized. Therefore, the transmission of drive signals by the system control unit 30 to circuits mounted on the electrical circuit board 14 and the optical image detecting unit 12 and that of digital image data from the electrical circuit board 14 to the system control unit 30 become possible from the connecting port 16b side. It is the same as in what was described above that the OR circuit 154 places the connecting port 16a side in an insulated state.

When the cable 20 is disconnected from the connecting port 16a or 16b, the relay circuits 152a and 152b, the relay circuits 192a and 192b, the trigger circuits 193a and the OR circuit 154 return to a state in which the cable 20 is connected to neither of the connecting ports 16a and 16b as shown in FIG. 6A.

Even if the connecting ports for the cable 20 are increased from just two including 16a and 16b to three or more, the control circuit 15A can be adapted to the changed situation by adopting a new circuitry in which the number of gates of the OR circuit 154 is increased and electrical energizing of the gate of one connecting port would automatically close all the gates linked to the other connecting ports.

Referring again to FIG. 1, the cable 20, consisting of signal lines for transmitting data between the electronic cassette 10 and the system control unit 30 and power lines for supplying power between the electronic cassette 10 and the power supply unit 40, connects the electronic cassette 10, the system control unit 30 and the power supply unit 40.

The cable 20, which is a composite cable for the signal system and the power supply system, separated into signal lines and power supply lines toward the ends of the system control unit 30 and the power supply unit 40, and connected to the system control unit 30 and the power supply unit 40. Toward the end of the electronic cassette 10 of the cable 20, there is provided a cable connector 22, and the cable 20 can be connected to and disconnected from the connecting port 16a or 16b via this cable connector 22.

The system control unit 30, having an input device 32 and a monitor 34, switches over data displayed on the monitor 34, compensates digital image data transmitted from the electronic cassette 10 and performs space filtering on a real time basis, gradation processing and dynamic range (DR) compression processing among other things. The system control unit 30 displays processed digital image data on the monitor 44 and stores them into the memory unit 50.

The system control unit 30 is connected to the electronic cassette 10 via the cable 20 to communicate with the electronic cassette 10. The system control unit 30 drives the radiation generator 60 and the electrical circuit board 14 (controls the operations of the radiation generator 60 and the electrical circuit board 14) on the basis of input information from the input device 32.

The system control unit 30, mounted with a LAN board (not shown), can be connected to a LAN via the LAN board. To the LAN may be connected such items as a filing server for filing image, an image printer for supplying images to a film and an image processing terminal for complex image processing and diagnosing support. The system control unit 30 supplies digital image data in accordance with a prescribed protocol (e.g. DICOM). The operator of the radiographic apparatus 1 can, after the completion of image pickup, move to a place where a port for LAN connection is available, and connect the port and the LAN board to perform data outputting. It is obviously permissible to install a port within the place of image pickup and start data outputting immediately after the completion of image pickup.

The input device 32 may be chosen out of a number of alternatives including a touch panel, a mouse, a keyboard and a foot switch. The operator of the radiographic apparatus 1 can set via the input device 32 various necessary conditions for radiography (for instance, the radiation tube voltage and amperage, and the duration of irradiation with a radiation), the timing of image pickup, image processing conditions, the subject's ID and the method of processing picked-up images.

The monitor 34, consisting of a CRT display for instance, displays radiographic conditions entered through the input device 32 and picked-up images. The contents of display on the monitor 34 are automatically changed over under the control of the system control unit 30, and can as well be manually changed over with a switching button (not shown). The monitor 34 receives digital image data from the system control unit 30, and displays them.

The power supply unit 40 supplies power to various parts of the radiographic apparatus 1 via the cable 20 and the power cables 17. With a view to greater portability, the power supply unit 40, together with the system control unit 30, is housed in a case with casters (not shown).

The memory unit 50 stores digital image data which have undergone various ways of processing by the system control unit 30. It is preferable for the memory unit 50 to satisfy requirements for a large capacity, high speed and high reliability, and may be, for instance, a hard disk array such as RAID.

The portable type radiation generator 60 has a radiation tube 62, a high voltage generating source 64 and a radiation diaphragm 66, and generates an X ray for instance. The radiation tube 62 is driven by the high voltage generating source 64 controlled by the system control unit 30, and emits a radiant beam. The radiation diaphragm 66 shapes the radiant beam to match changes in the target area of image pickup to avoid unnecessary irradiation. The radiant beam is directed to the target region of the patient P.

In performing radiography, the operator first inserts the electronic cassette 10 not connected to the cable 20 between the patient P and a bed 70. The insertion of the electronic cassette 10 not connected to the cable 20 is to eliminate the trouble of determining the arranging position of the electronic cassette 10 while taking care not to let the cable 20 enter the image pick-up area when handling the cable.

After completing the arrangement of the electronic cassette 10 in a position matching the target region of the patient P, the cable 20 is connected to either the connecting port 16a or 16b. In doing so, since one of the connecting ports 16a and 16b is always in a position convenient for the operator to connect the cable 20, he or she can arrange the electronic cassette 10 without having to pay particular attention to the positions of the connecting ports 16a and 16b of the electronic cassette 10. Nor is it necessary to oblige the patient P to change his or posture for the convenience of connecting the cable 20.

Here will be described a case in which the cable 20 is connected to the connecting port 16a. When the cable 20 is connected to the connecting port 16a, power is supplied from the power supply unit 40 to the input port 151a of the control circuit 15 via the power cable 17a. Receiving power supply from the input port 151a, the control circuit 15 opens the gates of the power supply path from the connecting port 16a to the electrical circuit board 14, and closes the gates of the power supply path from the connecting port 16b to the electrical circuit board 14. As a result, power is supplied from the power supply unit 40 to the electrical circuit board 14 via the power cables 17a and 17c. Also communication is made possible between the electronic cassette 10 and the system control unit 30 via the signal cable 18a.

Next, the system control unit 30 is informed of the start of image pickup via the input device 32. Informed of the start of image pickup, the system control unit 30 transmits a signal of the start of image pickup to the electrical circuit board 14 via the signal cable 18a. The system control unit 30 also drives the radiation tube 62 of the radiation generator 60 with the high voltage generating source 64, and further drives the radiation diaphragm 66 to designate the field of irradiation, to which the radiant beam is caused to be emitted.

The drive circuit 142 mounted on the electrical circuit board 14 detects an irradiation end signal from the luminous energy monitoring unit 13, a high voltage application signal from the high voltage generating source 64, or a signal of the current of the radiation tube 62, and drives a TFT switch to read out electric charges.

The system control unit 30 drives the high voltage generating source 64 on the basis of information on the amount of radiation exposure acquired by the luminous energy monitoring unit 13, and cuts off or controls the radiation. The drive circuit 142 drives the optical image detecting unit 12 under the control of the system control unit 30 to read out signals from different pixels. Digital image data are acquired as data (signals) from different pixels in the optical image detecting unit 12 selected by the drive circuit 142 are amplified by the amplifier 144, the amplified data are converted into digital data by the A/D conversion circuit 146, and the data successively digitized by the drive circuit 142 and the A/D conversion circuit 146 are serialized by the serializing circuit 148. The acquired digital image data are transmitted to the system control unit 30.

The system control unit 30 compensates and processes in various ways the transmitted digital image data, and stores the compensated or processed digital image data into the memory unit 50. After that, the operator disconnects the cable 20 from the connecting port 16a, and pulls out the electronic cassette 10 from between the patient P and the bed 70 to complete the image pickup task.

The same applies where the electronic cassette 10A is used in place of the electronic cassette 10 except that the transmission path of the signal system is different. Power transmission and the drive of various constituent elements are no different.

Next will be described another radiographic apparatus 2 with reference to FIG. 7. FIG. 7 is a schematic diagram of the radiographic apparatus 2 of the embodiment of the invention. The radiographic apparatus 2 of FIG. 7 is similar to the radiographic apparatus 1 of FIG. 1 except that the electronic cassette 10 is different. Members having counterparts in FIG. 1 will be assigned respectively the same reference numerals, and duplication of their description will be avoided.

Referring to FIG. 7, an electronic cassette 80 of the radiographic apparatus 2 has a grip (which may as well be referred to as a handle) 82 to enable the operator to get hold of the electronic cassette 80 more easily, and a connecting port 84 for connecting the cable 20 is provided on the same side as where this grip 82 is arranged.

The electronic cassette 80 (i.e. the radiation detection area) is formed in a substantially square shape. Though not shown, downstream from the cable 20 there are connected the system control unit 30 and the power supply unit 40 as shown in FIG. 1, and actions pertaining to image picking-up are the same, too.

When arranging the electronic cassette 80 for taking a radiograph of the patient P, the operator uses the grip 82 to insert the electronic cassette 80 not connected to the cable 20 between the patient P and the bed 70. In this action, the orientation of the grip 82 is limited all the time to the inserting side, and so is the connecting port 84.

When completing the arrangement of the electronic cassette 80 in a position matching the target region of the patient P, the operator connects the cable 20 to the connecting port 84. Therefore, once the operator using the grip 82 positions the electronic cassette 80, the connecting port 84 will always be on the side where it is easier to connect the cable 20, and there will be no need to oblige the patient P to change his or her posture for the convenience of connecting the cable 20.

Although the foregoing description supposed that the connecting port 84 be arranged on the side on which the grip 82 is arranged, the positioning of the connecting port 84 is not limited to this. By arranging the connecting port 84, for instance, on either of the two vertexes (corners) of that side after chamfering the edge in the same way as for the electronic cassette 10 of FIG. 1, the same effect as stated above can be achieved.

More generally speaking, when the electronic cassette 80 is viewed in the direction of arrow 700 in FIG. 7, which is the direction from the grip 82 toward the optical image detecting unit 12, the connecting port 84 may be provided in the area of the side of the case for the electronic cassette in which the grip 82 is visible (visible area).

If the connecting port is arranged on a side of the case substantially invisible from the direction of arrow 700, the absolute value of the angle between the direction in which the cable connector 22 is brought toward the connecting port when it is to be connected and the direction of arrow 700 will be between 90 and 180 degrees, which would make the connection extremely difficult. Therefore it is preferable to so configure the electronic cassette as to keep the absolute value of this angle less than 90 degrees, more preferably less than 75 degrees, still more preferably less than 60 degrees, and ideally 45 degrees or less. Incidentally, the preferable angle varies with the shape of the side of the electronic cassette case and the position of the connecting port among other factors.

Regarding the arrangement of the connecting port 84, another point of view which provides for what is closely similar to but somewhat different from the arrangement described above will be explained now. The detecting face of the optical image detecting unit is formed in a substantially quadrangular shape. Supposing the face including the radiation incidence face of the electronic cassette case opposite the detecting face is the front face, the grip 82 is contained in the side of the electronic cassette case opposite a prescribed side of the quadrangle. The connecting port 84 here is so provided that at least part of it is arranged in a side area of the case on the grip 82 side (which may as well be referred to as the grip side area) with respect to a plane containing that side and the normal line of the detecting face crossing that side. This arrangement makes it possible to easily connect the cable 20 to the connecting port 84 of the electronic cassette 80 arranged underneath the patient P via the cable connector 22 without having to force the patient P to change his or her posture.

Figure 8A:
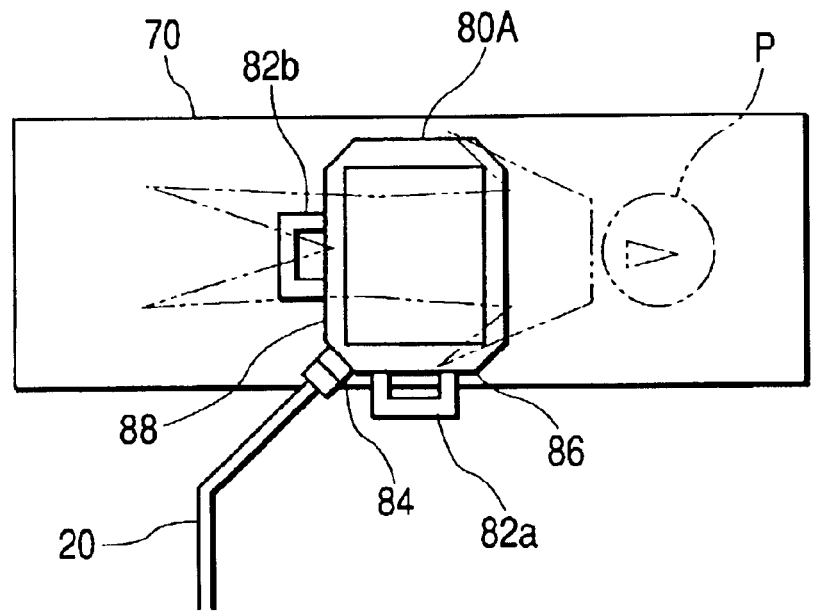
FIGS. 8A and 8B are sketchy diagrams illustrating an electronic cassette, which is a variation of the electronic cassette shown in FIG. 7.
Figure 8B:
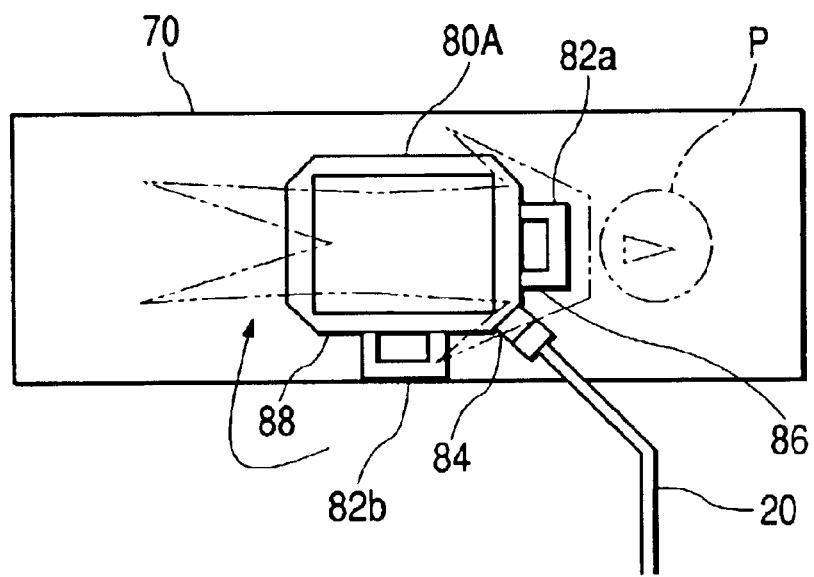

Next will be described an electronic cassette 80A, which is a variation of the electronic cassette 80, with reference to FIGS. 8A and 8B. FIGS. 8A and 8B here are sketchy diagrams illustrating a variation 80A of the electronic cassette 80, which is a variation of what is shown in FIG. 7. FIG. 8(A) is a sketchy diagram showing one example of arrangement of the electronic cassette 80A and FIG. 8(B), a sketchy diagram showing one example of arrangement of the electronic cassette 80A shown in FIG. 8(A) turned by 90°. In addition, the same members as what are shown in FIG. 7 will be assigned respectively the same reference numerals, and duplication of their description will be avoided.

Referring to FIGS. 8A and 8B, the electronic cassette 80A (i.e. the radiation detection area) is formed in a substantially rectangular shape. In the electronic cassette 80A, a grip 82a is provided on a short side 86, and a grip 82b on a long side 88, and further the connecting port 84 for connecting the cable 20 is provided at the vertex formed by the short side 86 and the long side 88. Though not shown, downstream from the cable 20 there are connected the system control unit 30 and the power supply unit 40 as shown in FIG. 1, and actions pertaining to image picking-up are the same, too.

When arranging the electronic cassette 80A as shown in FIG. 8A for taking a radiograph of the patient P, the operator uses the grip 82a to insert the electronic cassette 80A not connected to the cable 20 between the patient P and the bed 70. In this case, the connecting port 84 is at the left end of the short side 86 where the grip 82a is provided.

Next, the electronic cassette 80A is arranged in a position matching the target region of the patient P and, upon completion of the arrangement, the cable 20 is connected to the connecting port 84. Therefore, once the operator using the grip 82a positions the electronic cassette 80A, the connecting port 84 will always be on the side where it is easier to connect the cable 20, and there will be no need to oblige the patient P to change his or her posture for the convenience of connecting the cable 20.

Where the electronic cassette 80A is to be arranged as shown in FIG. 8B in a state turned by 90° relative to the arrangement of the electronic cassette 80A shown in FIG. 8A, the operator uses the grip 82b to insert the electronic cassette 80A not connected to the cable 20 between the patient P and the bed 70. In this case, the connecting port 84 is at the right end of the long side 88 where the grip 82b is provided.

Next, the electronic cassette 80A is arranged in a position matching the target region of the patient P and, upon completion of the arrangement, the cable 20 is connected to the connecting port 84. Therefore, as in the case illustrated in FIG. 8A, once the operator using the grip 82b positions the electronic cassette 80A, the connecting port 84 will always be on the side where it is easier to connect the cable 20, and there will be no need to oblige the patient P to change his or her posture for the convenience of connecting the cable 20.

As described above, once the operator using the grip 82a or 82b positions the electronic cassette 80A, the cable 20 can be easily connected to the connecting port 84.

Figure 9A:
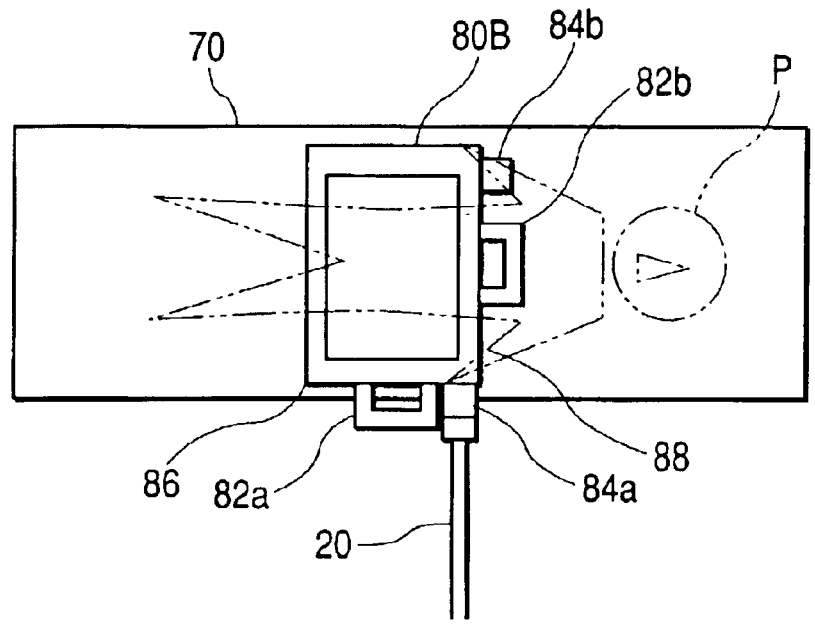
FIGS. 9A and 9B are sketchy diagrams illustrating an electronic cassette, which is a variation of the electronic cassette shown in FIGS. 8A and 8B.
Figure 9B:
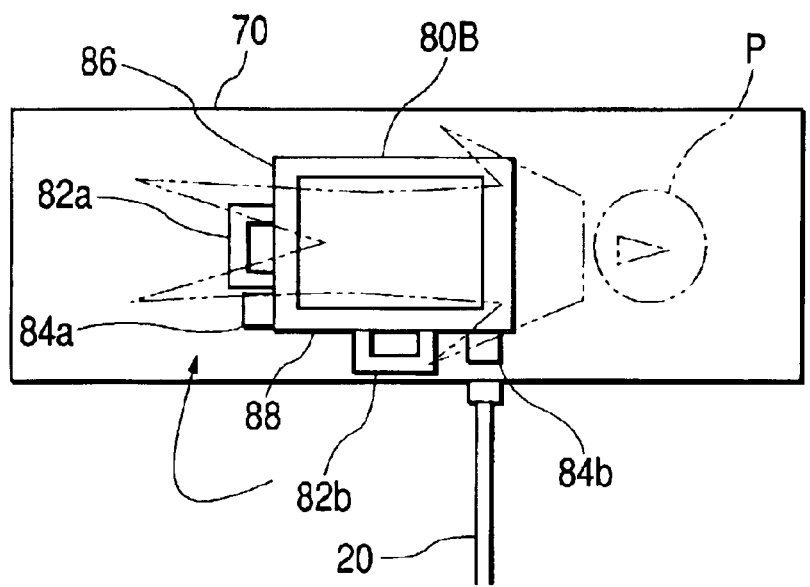
Figure 10:
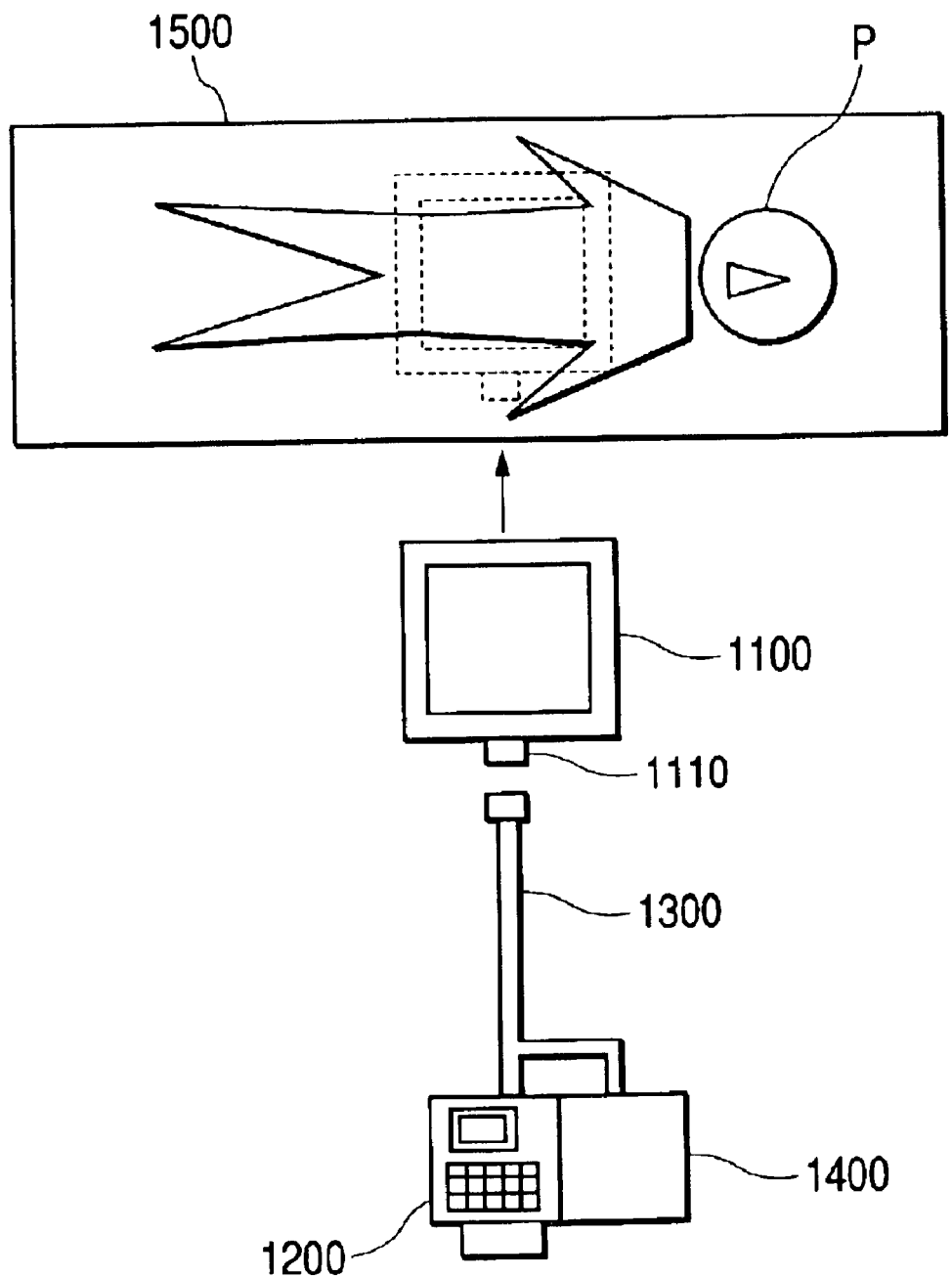
FIG. 10 is a schematic diagram illustrating a radiographic apparatus according to the prior art.
Figure 11:
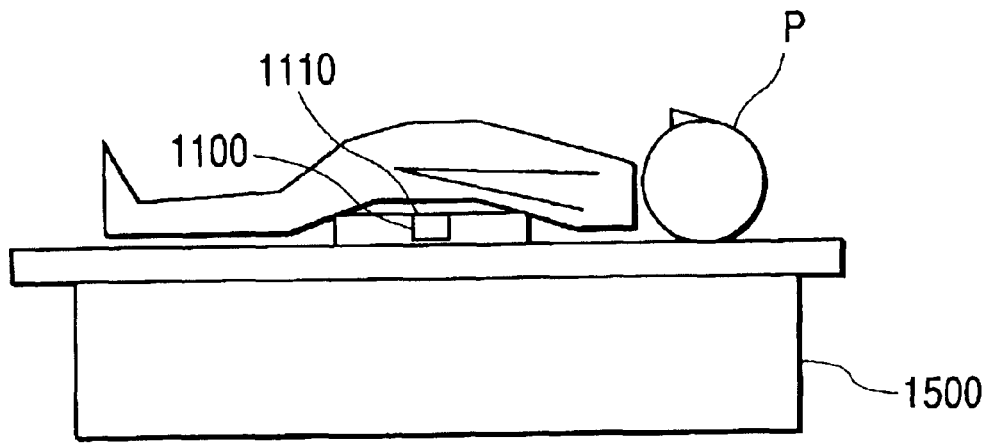
FIG. 11 is a sketchy diagram showing an example of arrangement of the electronic cassette shown in FIG. 10.
Figure 12:
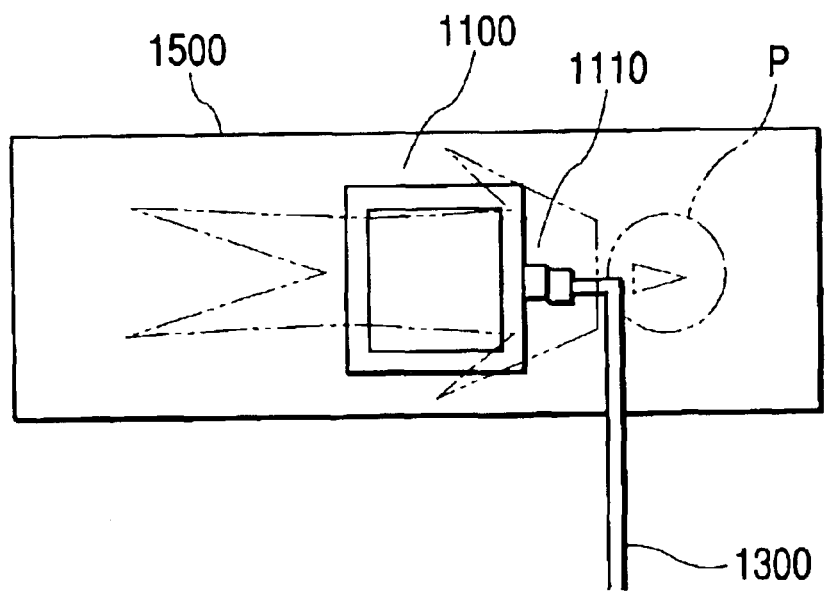
FIG. 12 is a sketchy diagram showing an arrangement of the electronic cassette shown in FIG. 11 turned by 90°.
Figure 13A:
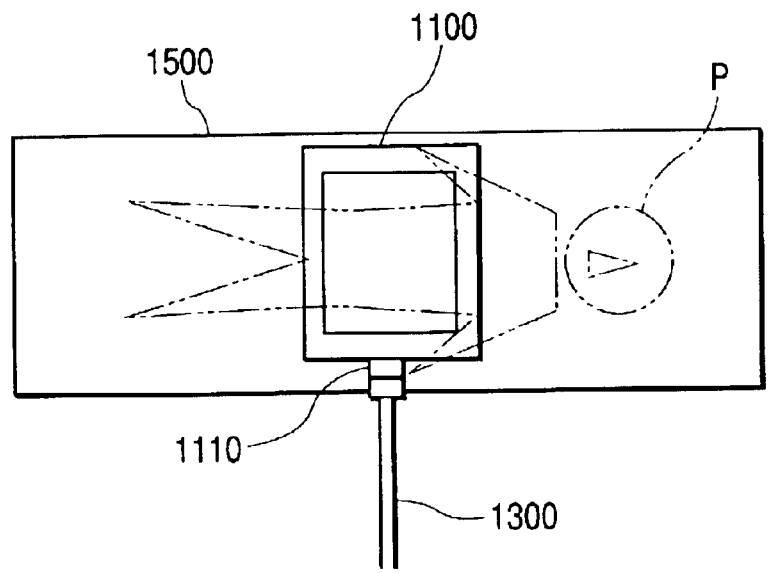
FIGS. 13A and 13B are sketchy diagram showing an example of arrangement of the electronic cassette shown in FIG. 10 in which the cassette is rectangularly shaped.
Figure 13B:
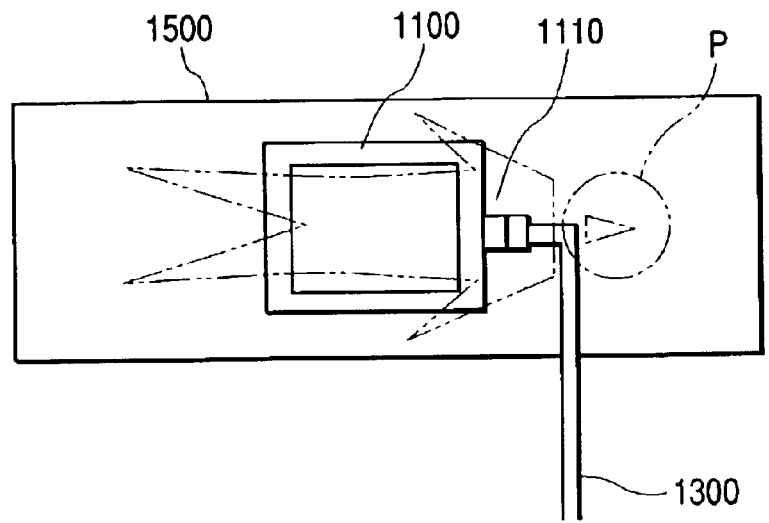

Next will be described with reference to FIGS. 9A and 9B the electronic cassette 80B, which is a variation of the electronic cassette 80A. FIGS. 9A and 9B here are sketchy diagrams of the electronic cassette 80B, which is a variation of the electronic cassette 80A shown in FIGS. 8A and 8B. FIG. 9A is a sketchy diagram showing one example of arrangement of the electronic cassette 80B and FIG. 9B, a sketchy diagram showing one example of arrangement of the electronic cassette 80B shown in FIG. 9A turned by 90°. In addition, the same members as what are shown in FIG. 8 will be assigned respectively the same reference numerals, and duplication of their description will be avoided.

Referring to FIGS. 9A and 9B, the electronic cassette 80B (i.e. the radiation detection area) is formed in a substantially rectangular shape. In the electronic cassette 80B, the grip 82a and the connecting port 84a are provided on the short side 86, and the grip 82b and the connecting port 84b, on the long side 88. Though not shown, downstream from the cable 20 there are connected the system control unit 30 and the power supply unit 40 as shown in FIG. 1, and actions pertaining to image picking-up are the same, too.

When arranging the electronic cassette 80B as shown in FIG. 9A for taking a radiograph of the patient P, the operator uses the grip 82a to insert the electronic cassette 80B not connected to the cable 20 between the patient P and the bed 70. In this case, as the connecting port 84a is provided on the short side 86 where the grip 82a is provided, the side from which the operator is to insert the electronic cassette 80B.

Next, the electronic cassette 80B is arranged in a position matching the target region of the patient P and, upon completion of the arrangement, the cable 20 is connected to the connecting port 84a. Therefore, once the operator using the grip 82a positions the electronic cassette 80B, the connecting port 84a will always be on the side where it is easier to connect the cable 20, and there will be no need to oblige the patient P to change his or her posture for the convenience of connecting the cable 20.

Where the electronic cassette 80B is to be arranged as shown in FIG. 9B in a state turned by 90° relative to the arrangement of the electronic cassette 80B shown in FIG. 9A, the operator uses the grip 82b to insert the electronic cassette 80B not connected to the cable 20 between the patient P and the bed 70. In this case, the connecting port 84b is provided on the long side 88 where the grip 82b is provided, the side from which the operator is to insert the electronic cassette 80B.

Next, the electronic cassette 80B is arranged in a position matching the target region of the patient P and, upon completion of the arrangement, the cable 20 is connected to the connecting port 84b. Therefore, as in the case illustrated in FIG. 9A, however the operator using the grip 82b may position the electronic cassette 80B, the connecting port 84b will always be on the side where it is easier to connect the cable 20, and there will be no need to oblige the patient P to change his or her posture for the convenience of connecting the cable 20.

As described above, once the operator using the grip 82a or 82b positions the electronic cassette 80B, the cable 20 can be easily connected to the connecting port 84a or 84b. In addition, grips and connecting ports are provided in two positions each in the electronic cassette 80B, all the four sides (all the vertexes as far as the connecting ports are concerned) may be provided with such grips and ports for greater convenience of connection.

As hitherto described, the present invention can achieve the object stated above.

The present invention is not limited to the above embodiments and various changes and modifications can be made within the spirit and scope of the present invention. Therefore to apprise the public of the scope of the present invention, the following claims are made.

What is claimed is:

1. A cassette-type image taking apparatus for acquiring a radiograph of an object, comprising:
   an electric circuit unit including a radiation image detecting unit;
   a case which contains said electric circuit unit; and
   a plurality of connecting ports provided in said case, each of which is capable of connecting, in a detachable manner, a cable for electrically connecting said electric circuit unit and an external device,
   wherein the plurality of connecting ports have electrically identical functions, and
   wherein the cassette-type image taking apparatus functions identically for connections of an external device to any of the plurality of connecting ports.

2. The apparatus according to claim 1, wherein said radiation image detecting unit has a substantially rectangular shape, and the connecting ports are provided at corners diagonally located in the substantially rectangular shape of said radiation image detecting unit.

3. The apparatus according to claim 2, wherein said connecting ports are provided at each corner of the substantially rectangular shape of said radiation image detecting unit.

4. The apparatus according to claim 1, further provided with a control circuit which identifies one of said plurality of connecting ports to which said cable is connected, and permits only the identified connecting port to establish electric connection between said electric circuit unit and said external device.

5. The apparatus according to claim 4, wherein said electric connection is utilized for at least one of power supply from said external device to said electric circuit unit and communication between said electric circuit unit and said external device.

6. The apparatus according to claim 1, wherein the cassette-type image taking apparatus has a substantially rectangular shape when viewed from a direction normal to a radiation detecting surface of said radiation image detecting unit, and wherein a handle is provided on a side of the substantially rectangular shape.

7. The apparatus according to claim 6, wherein a plurality of handles are provided at a plurality of sides of said substantially rectangular shape.

8. The apparatus according to claim 7, wherein four of said plurality of handles are provide at four sides of said substantially rectangular shape.

9. The apparatus according to claim 6, wherein said connecting ports are utilized for at least one of power supply from said external device to said electric circuit unit and communication between said electric circuit unit and said external device.

10. A radiographic apparatus comprising:
   a cassette-type image taking apparatus for acquiring a radiograph of an object, comprising:
   an electric circuit unit including a radiation image detecting unit;
   a case which contains said electric circuit unit; and
   a plurality of connecting ports provided in said case, each of which is capable of connecting, in a detachable manner, a cable for electrically connecting said electric circuit unit and an external device, and said external device,
   wherein the plurality of connecting ports have electrically identical functions, and
   wherein the cassette-type image taking apparatus functions identically for connections of an external device to any of the plurality of connecting ports.

11. The apparatus according to claim 10, wherein said external device has at least either of functions of controlling an operation of said cassette-type image taking apparatus and processing data from said cassette-type image taking apparatus.

12. The apparatus according to claim 10, wherein the cassette-type image taking apparatus has a substantially rectangular shape when viewed from a direction normal to a radiation detecting surface of said radiation image detecting unit, and wherein a handle is provided on a side of the substantially rectangular shape.

13. The apparatus according to claim 12, wherein said external device has at least either of functions of controlling an operation of said cassette-type image taking apparatus and processing data from said cassette-type image taking apparatus.

* * * * *

UNITED STATES PATENT AND TRADEMARK OFFICE
CERTIFICATE OF CORRECTION

PATENT NO.     : 6,855,936 B2
DATED          : February 15, 2005
INVENTOR(S)    : Osamu Yamamoto It is certified that error appears in the above-identified patent and that said Letters Patent is hereby corrected as shown below:

Column 1,
Line 37, "a another" should read -- another --.
Line 47, "applicable" should read -- applicability --.
Line 66, "apparatus;" should read -- apparatus, --.

Column 5,
Line 46, "diagram" should read -- diagrams --.

Column 12,
Line 30, "his or" should read -- his or her --.

Column 17,
Line 18, "provide" should read -- provided --.

Signed and Sealed this

Twenty-fourth Day of January, 2006

JON W. DUDAS
*Director of the United States Patent and Trademark Office*